(12) United States Patent
Lee et al.

(10) Patent No.: US 7,379,746 B2
(45) Date of Patent: May 27, 2008

(54) METHOD FOR TRANSMITTING POWER CONTROL INFORMATION FOR HS-SCCH IN MOBILE COMMUNICATION SYSTEM

(75) Inventors: Young-Dae Lee, Kyungki-Do (KR); Jin-Young Park, Kyungki-Do (KR)

(73) Assignee: LG Electronics Inc., Seoul (KR)

( * ) Notice: Subject to any disclaimer, the term of this patent is extended or adjusted under 35 U.S.C. 154(b) by 541 days.

(21) Appl. No.: 10/294,895

(22) Filed: Nov. 15, 2002

(65) Prior Publication Data
US 2003/0114181 A1 Jun. 19, 2003

(30) Foreign Application Priority Data
Nov. 16, 2001 (KR) .................. 10-2001-0071202
Nov. 19, 2001 (KR) .................. 10-2001-0071787

(51) Int. Cl.
*H04B 7/00* (2006.01)
*H04Q 7/20* (2006.01)

(52) U.S. Cl. ............... 455/522; 455/442; 455/450; 455/455; 455/456.1; 455/525; 455/439; 455/69; 370/318; 370/332; 370/338

(58) Field of Classification Search ........... 455/522, 455/69, 436, 439, 442, 450, 456.1, 525, 455; 370/318, 320, 331, 332, 333, 337, 338, 328, 370/329
See application file for complete search history.

(56) References Cited

U.S. PATENT DOCUMENTS 6,564,067 B1 * 5/2003 Agin .................. 455/522
6,567,670 B1 * 5/2003 Petersson ............. 455/522
6,594,499 B1 * 7/2003 Andersson et al. ...... 455/522

(Continued)

FOREIGN PATENT DOCUMENTS

EP  0 993 128 A1  4/2000

(Continued)

OTHER PUBLICATIONS

Motorola, "Control Channel Structure for High Speed DSCH (HS-DSCH)," TSGR1/R2-12A010021, Sophia Antipolis, France, Apr. 5-6, 2001, pp. 1-5, (XP-002206396).

(Continued)

*Primary Examiner*—Matthew Anderson
*Assistant Examiner*—Shaima Q. Aminzay
(74) *Attorney, Agent, or Firm*—Ked & Associates, LLP

(57) ABSTRACT

A method for controlling transmission power of shared control channel for high speed downlink shared channel (HS-SCCH) in an UMTS system adopting a high speed downlink packet access (HSDPA) is disclosed in which a power offset value for power control of HS-SCCH is determined by a serving radio network controller and transmitted as a control frame or message type to a base station. A first PO field for transmitting a PO value for non-handover or soft handover of a dedicated physical control channel, a second PO field for transmitting a PO value used for the primary cell and a third PO field for transmitting a PO value used for the non-primary cell are selectively implemented in the control frame or message type, so that the transmission power of HS-SCCH can be suitably controlled according to changes in environment or circumstances of the radio link.

25 Claims, 7 Drawing Sheets

U.S. PATENT DOCUMENTS

| | | | | |
|---|---|---|---|---|
| 6,643,318 | B1* | 11/2003 | Parsa et al. | 375/141 |
| 6,650,905 | B1* | 11/2003 | Toskala et al. | 455/522 |
| 6,850,759 | B2* | 2/2005 | Van Lieshout et al. | 455/426.1 |
| 6,898,429 | B1* | 5/2005 | Vialen et al. | 455/432.1 |
| 6,941,132 | B2* | 9/2005 | Van Lieshout et al. | 455/418 |
| 6,970,716 | B2* | 11/2005 | Rune et al. | 455/552.1 |
| 2002/0003785 | A1* | 1/2002 | Agin | 370/333 |
| 2002/0077141 | A1* | 6/2002 | Hwang et al. | 455/522 |
| 2002/0115464 | A1 | 8/2002 | Hwang et al. | 455/522 |
| 2002/0172208 | A1* | 11/2002 | Malkamaki | 370/400 |
| 2002/0183075 | A1* | 12/2002 | Fauconnier | 455/456 |
| 2005/0063347 | A1* | 3/2005 | Sarkkinen et al. | 370/338 |
| 2005/0208961 | A1 | 9/2005 | Willenegger | 455/522 |

FOREIGN PATENT DOCUMENTS

| | | |
|---|---|---|
| EP | 1 059 736 A2 | 12/2000 |
| EP | 1 089 458 A2 | 4/2001 |
| EP | 1 313 231 A2 | 5/2003 |
| EP | 1 313 334 A2 | 5/2003 |
| KR | 10-2002-0029143 A | 4/2002 |
| KR | 10-2002-0036639 A | 5/2002 |
| KR | 10-2002-0038823 A | 5/2002 |
| KR | 10-2002-0060900 A | 7/2002 |

OTHER PUBLICATIONS

Lucent Technologies, Text Proposal for the HSDPA Technical Report, TSGR1#17(00)1384, Stockholm, Sweden, Nov. 21-24, 2000, pp. 1-9, (XP-002175651).

European Office Action dated Oct. 18, 2006.

European Search Report dated Jun. 21, 2004.

European Search Report dated Mar. 13, 2003.

PCT Search Report dated Mar. 10, 2003.

3GPP TS 25.214 v3.8.0 (Sep. 2001); Technical Specification; 3$^{rd}$ Generation Partnership Project; Technical Specification Group Radio Access Network; Physical Layer Procedures (FDD) (Release 1999); pp. 11-27.

LG Electronics Inc., "Text Proposal for TR25.841: Improvement of Power Control for DSCH in Soft Handover"; 3GPP TSG RAN WG 1#18; Boston, MA; Jan. 15-18, 2001; TSG R1-01-0063, pp. 1-9.

* cited by examiner

METHOD FOR TRANSMITTING POWER CONTROL INFORMATION FOR HS-SCCH IN MOBILE COMMUNICATION SYSTEM

BACKGROUND OF THE INVENTION

1. Field of the Invention

The present invention relates to a 3GPP universal mobile telecommunication system (UMTS) system and, more particularly, to method for transmitting control information of a high speed shared control channel (HS-SCCH).

2. Background of the Related Art

In general, a UMTS system of third generation partnership project (3GPP) supports a new high speed downlink shared channel (HS-DSCH) in order to support a high speed packet data service. The HS-DSCH is used in a system following a Release 5 which specifies a high speed downlink packet access (HSDPA) among the technical specifications of 3GPP.

Unlike a W-CDMA system of the existing 3GPP Release 99/Release 4, the HS-DSCH uses a short transmission time interval (TTI) (3 slot, 2 ms) and supports diverse modulation code sets (MCS) and hybrid ARQ (HARQ) techniques in order to support a high data rate.

The HS-DSCH, a transport channel, of the HSDPA system, is mapped onto HS-PDSCH (High Speed Physical Downlink Shared Channel). The HS-PDSCH has been devised to transmit high speed user data to different users through each sub-frame.

FIG. 1 illustrates the construction of the HS-PDSCH. As shown in FIG. 1, the HS-PDSCH is constructed with 2 ms sub-frame and different users can share it for use through each sub-frame.

In order for a user equipment (UE=terminal) to receive a user data through the HS-DSCH, a shared control channel for HS-DSCH (HS-SCCH) and a dedicated physical channel (DPCH) should be constructed.

FIG. 2 illustrates a structure of a frame of a physical channel constructed in the dedicated physical channel (DPCH). With reference to FIG. 2, the DPCH is constructed with 10 ms—period (Tf) radio frame, and each frame includes 15 slots (Slot #0~Slot #14). One slot length (Tslot) is 2560 chips, and a dedicated physical data channel (DPDCH) and a dedicated physical control channel (DPCCH) are alternately inserted in each slot.

In the DPCH, in turn from left, Ndata1 bit data (Data1) is included in the first DPDCH, a TPC (NTPC bit) and a TFCI (NTFCI) bit) are included in the first DPCCH, Ndata2 bit data (Data2) is included in the second DPDCH, and an Npilot bit pilot signal is included in the second CPCCH. The TFCI field includes size information of a data transmitted to a data field.

The HS-SCCH, a physical channel, is a type of a downlink common control channel to support the HS-DSCH. HS-SCCH transmits a UE ID (Identification) and control information so that the terminal can receive the HS-DSCH transmitting the high speed user data.

The UE ID and the control information are transmitted through each sub-frame (2 ms) of the HS-SCCH. The control information transmitted through the HS-SCCH is generated by a Node B (a base station) to which a cell transmitting the HS-DSCH belongs. The UE monitors the UE ID transmitted through the HS-SCCH to recognize whether there is a data to be received by itself and then receives a user data transmitted through HS-DSCH by using control information transmitted through HS-SCCH.

FIG. 3 is a structure of a sub-frame of HS-SCCH.

As shown in FIG. 3, HS-SCCH is constructed with a 2 ms sub-frame and different users can share it for use through each sub-frame. The control information that HS-SCCH transmits is roughly divided into transport format and resource related information (TFRI) and HARQ related information. The TFRI includes information related to a HS-DSCH transport channel set size, modulation, a coding rate and the number of multicodes, and the HARQ related information includes information such as a block number, a redundancy version. Besides, UE ID information representing user information is transmitted.

Each UE has an associated downlink DPCH, and as shown in FIG. 4, the terminal can receive maximum 4 HS-SCCHs.

FIG. 5 is a drawing illustrating a transmission timing of the HS-SCCH and the HS-DSCH. As shown in FIG. 5, after the UE ID and the control information are transmitted through the HS-SCCH, a data is transmitted through the HS-DSCH. The UE reads the control information transmitted through HS-SCCH and restores an HS-DSCH data. At this time, by enlarging an overlapping interval of the two channels as much as possible, a transmission delay can be reduced.

As mentioned above, in the case that a high speed user data is provided to different users through the HS-DSCH proposed in the HSDPA technique, at least one or more HS-SCCHs are configured in one cell. Especially, if there are many HSDPA terminals, configuration of plural HS-SCCHs in one cell ensures providing of an effective data service.

FIG. 6 illustrates a structure of a conventional UMTS radio access network (UTRAN). With reference to FIG. 6, UTRAN 112 has a structure that a serving RNC (SRNC) 114 and a drift RNC (DRNC) control base stations (Node B), respectively, and in soft handover, the UE (=mobile station) maintains a traffic channel with the base stations 118 and 120 located in the SRNC 114 and the DRNC 116.

A plurality of base stations (Node B) are placed under the SRNC 114 and the DRNC 116, and in occurrence of soft handover, the UE 122 can be simultaneously connected with each base station belonging to the SRNC 114 and the DRNC 116. The base station (Node B), SRNC 114 and DRNC 116 are connected through an Iub interface, and SRNC 114 and DRNC 116 are connected through an Iur interface. An interface between SRNC 114 and core network (CN) 110 is called 'Iu'.

In general, the radio network controller (RNC) includes a control RNC (CRNC) (not shown) managing a common radio resource and a serving RNC (SRNC) 114 managing a dedicated radio resource allocated to each UE 122. The DRNC 116, existing in a drift radio network subsystem (DRNS), is a control station of a destination which provides a radio resource to the UE 122 if the UE 122 goes beyond the SRNC 114 and moves into its area.

In the UMTS system, transmission power of a common channel is determined by the CRNC, which manages a common radio resource. The power of the common channel determined by the CRNC is included in the data frame and transmitted to the base station (Node B) and the base station sets transmission power of the common channel on the basis of the transmission power value included in the data frame. Meanwhile, transmission power of a dedicated channel is determined by an SRNC which manages a dedicated radio resource. The power of dedicated channel as determined in the SRNC is included in a control frame and transmitted to the base station (Node B), and the base station sets transmission power of the dedicated channel on the basis of the transmission power value included in the control frame.

FIG. 7 illustrates a structure of a control frame used for updating a radio interface parameter in the UTRAN. With reference to FIG. 7, the control frame consists of a 2 byte flag field indicating whether there is a parameter, a 1 byte connection frame number (CFN), a 5 bit transmit power control (TPC) power offset (PO) and a 1 bit downlink power control (DPC) mode information field and is constructed with more than a 4 byte payload overall.

As stated above, in the current system, power of the common channel is controlled by the CRNC. HS-SCCH, a kind of the common channel, transmits information of different terminals through each sub-frame. Like the current system, if the CRNC manages power of HS-SCCH, the common channel, it is not possible for the CRNC to control power of HS-SCCH suitably to radio channel of each terminal. The reason is at least because the CRNC can not be aware of the radio channel condition of each terminal. Therefore, the current system can not effectively control power of HS-SCCH.

The above references are incorporated by reference herein where appropriate for appropriate teachings of additional or alternative details, features and/or technical background.

SUMMARY OF THE INVENTION

An object of the invention is to solve at least the above problems and/or disadvantages and to provide at least the advantages described hereinafter.

Therefore, an object of the present invention is to provide a control information transmitting method of a mobile communication system that is capable of controlling transmission power of an HS-SCCH.

Another object of the present invention is to provide a control information transmitting method of a mobile communication system that is capable of transmitting a power offset (PO) value of an HS-SCCH.

Still another object of the present invention is to provide a novel control message and frame structure for transmitting a power offset value of an HS-SCCH to a base station.

Yet another object of the present invention is to provide a control message and a frame structure that are capable of selectively transmitting a PO value of an HS-SCCH according to a radio link environment or change in circumstances.

Another object of the present invention is to provide a control information transmitting method of a mobile communication system in which an SRNC determines a power offset (PO) value relative to a DPCCH and transmits it to a base station.

To achieve at least the above objects in whole or in parts, there is provided a control information transmitting method of a mobile communication system including: a step in which a radio network controller (RNC) determines a power offset (PO) value of a shared control channel for HS-DSCH (HS-SCCH); a step in which the determined PO value is transmitted to a base station through a radio access interface protocol; and a step in which a transmission power of the HS-SCCH is determined by using the transmitted PO value.

In the control information transmitting method of a mobile communication system of the present invention, preferably, the RNC is a serving RNC (SRNC) managing a dedicated radio resource allocated to each UE.

In the control information transmitting method of a mobile communication system of the present invention, preferably, the radio access interface protocol is a control plane or a user plane, and the transmission power of HS-SCCH is determined by a power offset value for each field power of a dedicated physical control channel (DPCCH).

In the control information transmitting method of a mobile communication system of the present invention, preferably, if the radio access interface protocol is the control plane protocol, the power offset (PO) value is transmitted as a message type, while if the radio access interface protocol is a user plane protocol, the power offset value is transmitted as a control frame type.

In the control information transmitting method of a mobile communication system of the present invention, preferably, the message is a radio network subsystem application part (RNSAP) message used between the SRNC and drift RNCs and a Node B application part (NBAP) used between the SRNC and a base station.

In the control information transmitting method of a mobile communication system of the present invention, preferably, the control frame includes a PO field for transmitting one PO value.

In the control information transmitting method of a mobile communication system of the present invention, preferably, the control frame includes a PO field transmitting a PO value for non-handover or soft handover.

In the control information transmitting method of a mobile communication system of the present invention, preferably, the control frame includes a first PO field transmitting a PO value for non-handover or soft handover; and a second PO field transmitting a PO value for HS-SCCH used in a primary cell.

In the control information transmitting method of a mobile communication system of the present invention, preferably, the control frame includes a first PO field transmitting a PO value for non-handover or soft handover; a second PO field transmitting a PO value for HS-SCCH used in a primary cell; and a third PO field transmitting a PO value used in a non-primary cell.

To achieve at least these advantages in whole or in parts, there is further provided a control information transmitting method of a mobile communication system in which transmission power of a shared control channel for HS-DSCH (HS-SCCH) transmitted from a base station to a UE is determined by using a power offset (PO) value relative to a dedicated physical control channel (DPCCH), wherein the power offset value is determined in a serving radio network controller (SRNC) and transmitted to the base station through a radio access interface protocol.

In the control information transmitting method of a mobile communication system of the present invention, preferably, if the radio access interface protocol is a control plane protocol, the power offset (PO) value is transmitted as a message or as a control frame type.

In the control information transmitting method of a mobile communication system of the present invention, preferably, the message is a radio network subsystem application part (RNSAP) message used between the SRNC and drift RNCs; and a Node B application part (NBAP) used between the SRNC and a base station.

In the control information transmitting method of a mobile communication system of the present invention, preferably, the control frame includes a PO field for transmitting one PO value.

In the control information transmitting method of a mobile communication system of the present invention, preferably, the control frame includes a PO field transmitting a PO value for non-handover or soft handover.

In the control information transmitting method of a mobile communication system of the present invention, preferably, the control frame includes a first PO field transmitting a PO value for non-handover or soft handover; and a second PO field transmitting a PO value for HS-SCCH used in a primary cell.

In the control information transmitting method of a mobile communication system of the present invention, preferably, the control frame includes a first PO field transmitting a PO value for non-handover or soft handover; a second PO field transmitting a PO value for HS-SCCH used in a primary cell; and a third PO field transmitting a PO value used in a non-primary cell.

To achieve at least these advantages in whole or in parts, there is further provided a control information transmitting method of a universal mobile communication system (UMTS) in which transmission power of a high speed shared control channel (HS-SCCH) transmitted from a base station to a UE is determined by a power offset (PO) value relative to a dedicated physical control channel (DPCCH), wherein the power offset value is determined in a serving radio network controller (SRNC) and transmitted as a control frame or as a message type to the base station through a radio access interface protocol.

In the control information transmitting method of a UMTS of the present invention, preferably, the message is a radio network subsystem application part (RNSAP) message used between the SRNC and drift RNCs; and a Node B application part (NBAP) used between the SRNC and a base station.

In the control information transmitting method of a UMTS of the present invention, preferably, the control frame includes a PO field for transmitting one PO value.

In the control information transmitting method of a UMTS of the present invention, preferably, the control frame includes a PO field transmitting a PO value for non-handover or soft handover.

In the control information transmitting method of a UMTS of the present invention, preferably, the control frame includes a first PO field transmitting a PO value for non-handover or soft handover; and a second PO field transmitting a PO value for HS-SCCH used in a primary cell.

In the control information transmitting method of a UMTS of the present invention, preferably, the control frame includes a first PO field transmitting a PO value for non-handover or soft handover; a second PO field transmitting a PO value for HS-SCCH used in a primary cell; and a third PO field transmitting a PO value used in a non-primary cell.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

In general, HS-SCCH is divided into a plurality of sub-frames (e.g., $T_{frame}$=2 ms), and each sub-frame transmits control information dedicated to a specific UE. Using such characteristics, in embodiments according to the present invention, unlike a general common control channel, each sub-frame of HS-SCCH is transmitted with required power for each UE (e.g., UE #1-UE #4).

For this purpose, in embodiments according to the present invention, preferably the power control of HS-SCCH is performed by using the power control of DPCH for each UE. That is, the transmission power of HS-SCCH can be controlled by using a power offset (PO) value relative to the transmission power of a downlink (DL) DPCH. More specifically, a PO value for transmission power of a pilot field of a DPCCH can be used.

In general, a radio access interface protocol is divided into a control plane for transmitting a control signal and a user plane for transmitting data information. The user plane is a region to which user traffic information is transmitted such as transmission of a voice or an IP packet, and the control plane is a region to which control information for managing a network interface or call is transmitted.

Figure 8:
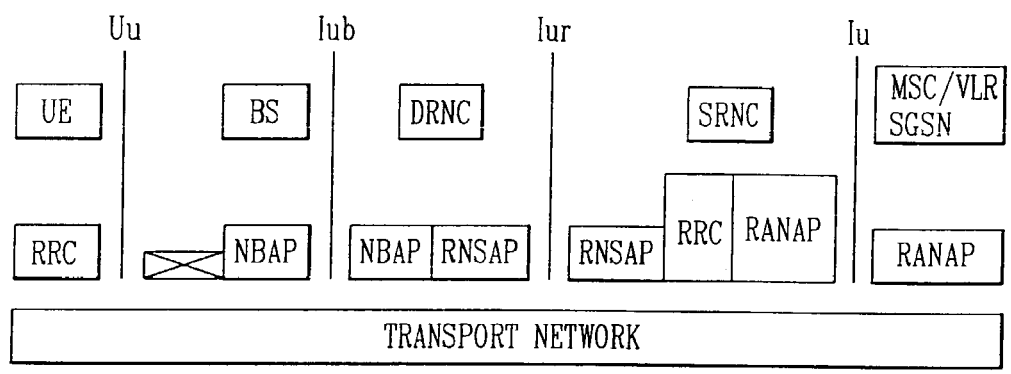
FIG. 8 illustrates a control plane protocol of UTRAN.
Figure 9:
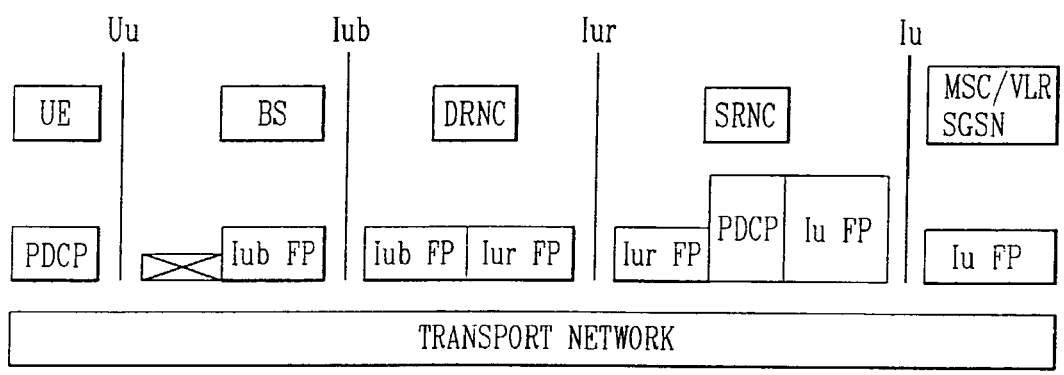
FIG. 9 illustrates a user plane protocol of UTRAN.

FIG. 8 illustrates a control plane protocol of a UTRAN, and FIG. 9 illustrates a user plane protocol of the UTRAN.

With reference to FIG. 8, the control plane protocol can include a radio resource control (RRC) protocol used between a mobile station (=UE) and an RNC, a Node B application part (NBAP) protocol used between a base station (Node B) and the RNC, a radio network subsystem application part (RNSAP) protocol used between RNCs, and a radio access network application part (RANAP) protocol used between the RNC and core network (CN).

The control plane protocol exists under a client-server principle environment, and in the Iu interface, a UMTS radio access network 112 and the core network 110 serve as a server and a client, respectively. Likewise, in the Iub interface, the base station serves as a server and the RNC serves as a client. In the Iur interface, the DRNC serves as a server and the SRNC serves as a client which requests a control service for remote base stations.

The NBAP, RNSAP and RANAP protocols may contain various control message for a radio access bearer between the base station and RNC, between RNCs and between the core network and RNC. At this time, when the control message is transmitted to the user plane, it is transmitted as a control frame type, while if the control message is transmitted to the control plane, it is transmitted as an NBAP or RNSAP message.

Preferably in the present invention, when the base station receives a transmit power control (TPC) command from the mobile station (=UE), it sets transmission power of the DL DPCH on the basis of the received power control command and determines transmission power of HS-SCCH transmitted to a mobile station by using a power offset (PO) value relative to the transmission power of the DL DPCH.

At this time, the power offset (PO) value for the power control of HS-SCCH is determined by the radio network controller (RNC), and more specifically, by the SRNC, and transmitted to the base station. In the conventional system, the transmission power of the common channel is determined by the CRNC. However, since the specific sub-frame of HS-SCCH needs only to receive a specific UE, the PO value of HS-SCCH is determined by the SRNC and transmitted to the base station, and the base station determines transmission power of HS-SCCH.

In case of the user plane, the PO value determined by the SRNC is transmitted as a control frame type, while in case of the control plane, the PO value is transmitted as an NBAP or RNSAP message type.

That is, as shown in FIGS. 8 and 9, the SRNC determines the PO value for HS-SCCH and transmits a control frame or a message (RNSAP) containing the HS-SCCH PO value to the DRNC through the Iur interface. Then, the DRNC transmits the control frame or the message (NBAP) to the base station (BS) through the Iub interface. Thus, the base station adjusts the transmission power of HS-SCCH by using the HS-SCCH PO value contained in the received control message or the message (NBAP or RNSAP).

Figure 10:
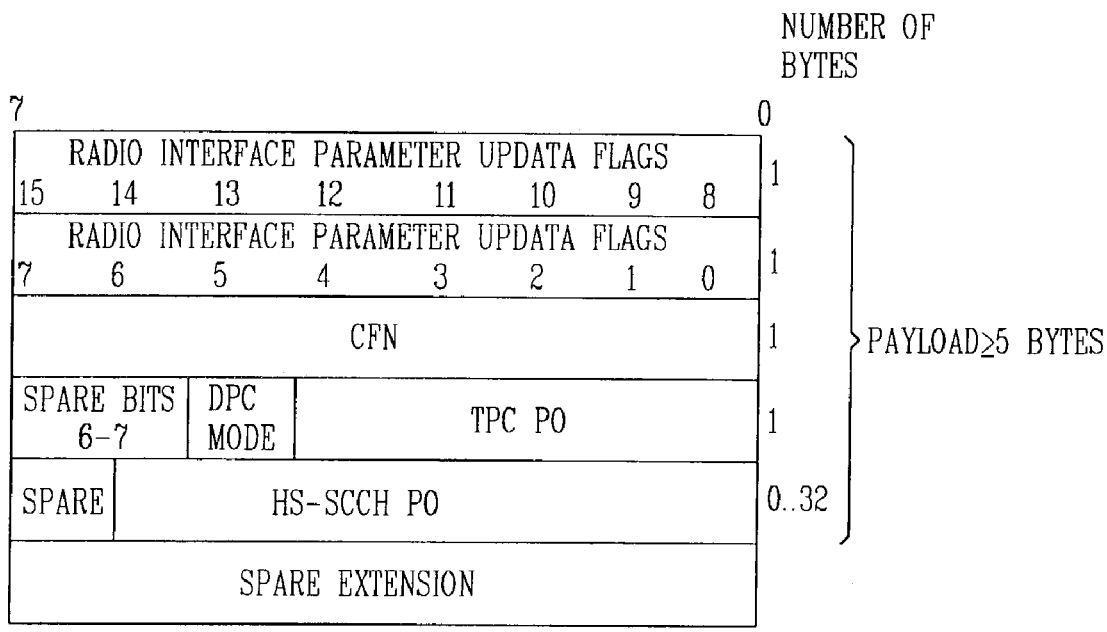
FIG. 10 illustrates a format construction of a radio interface parameter update control frame to control power of HS-SCCH used for HS-DSCH in accordance with a first embodiment of the present invention.

FIG. 10 illustrates a control frame structure for transmitting a PO value of HS-SCCH through the user plane in accordance with a first embodiment of the present invention.

Figure 1:
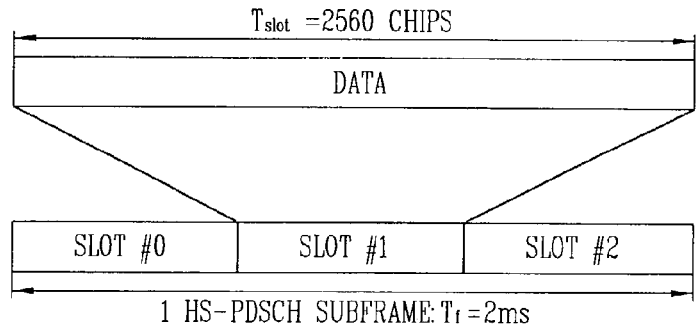
FIG. 1 illustrates a structure of a sub-frame of a high speed physical downlink shared channel (HS-PDSCH)
Figure 2:
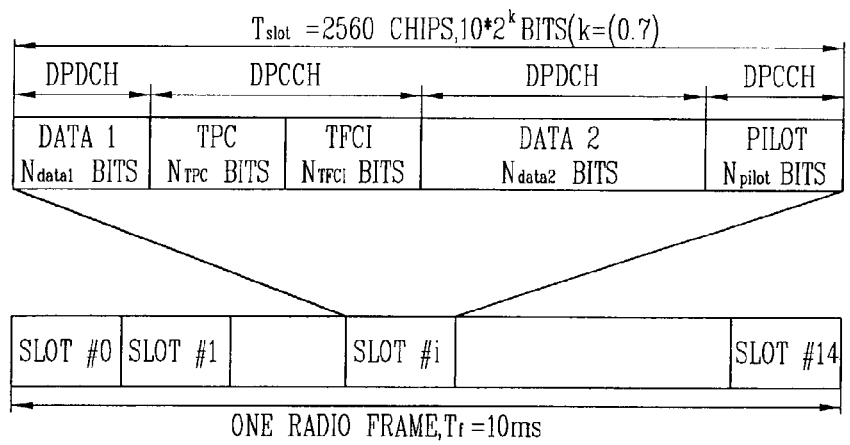
FIG. 2 illustrates a frame structure of a physical channel constructed in a downlink (DL) dedicated physical channel (DPCH)
Figure 3:
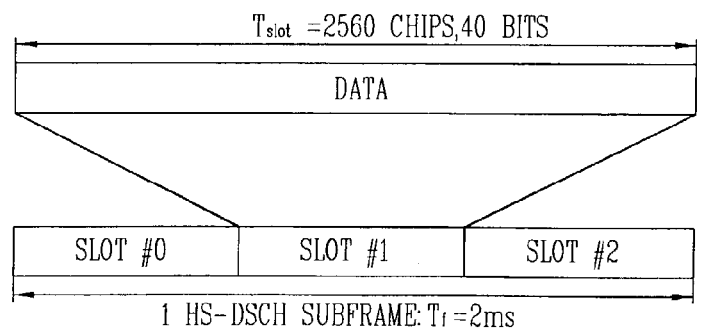
FIG. 3 illustrates a sub-frame structure of a high speed shared control channel (HS-SCCH)
Figure 4:
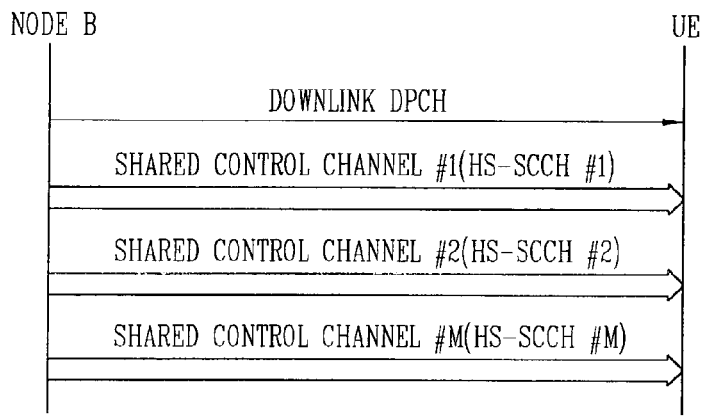
FIG. 4 illustrates one example the a UE simultaneously receives HS-SCCHs from a base station (Node B)
Figure 5:
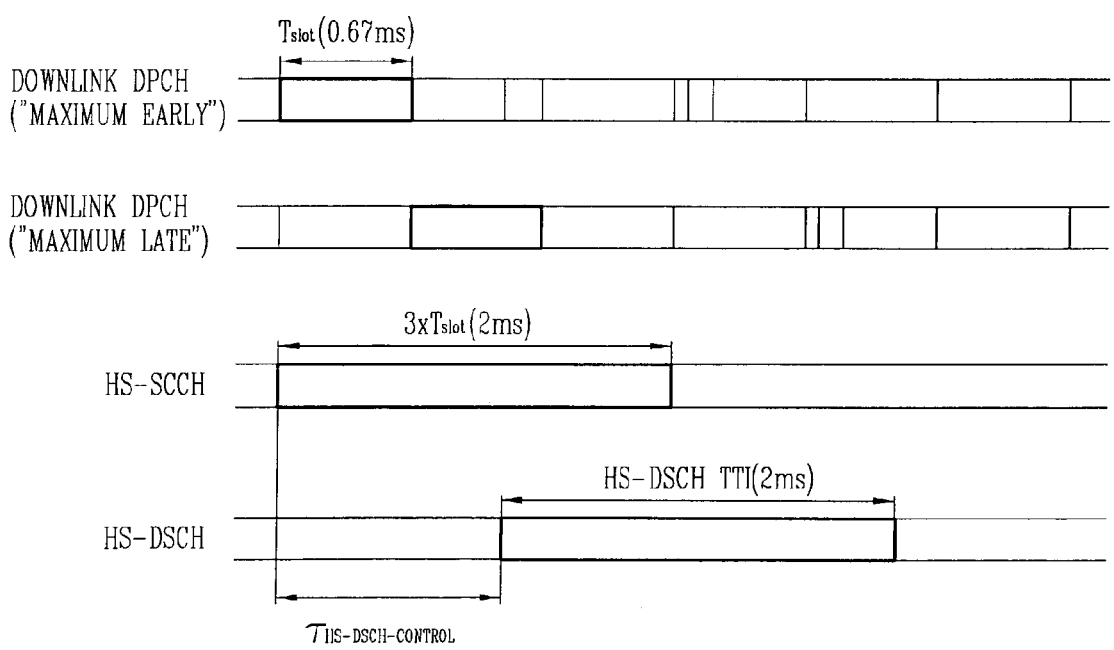
FIG. 5 illustrates a signaling of HS-SCCH and a transmission timing of HS-SCCH and HS-DSCH to transmit control information.
Figure 6:
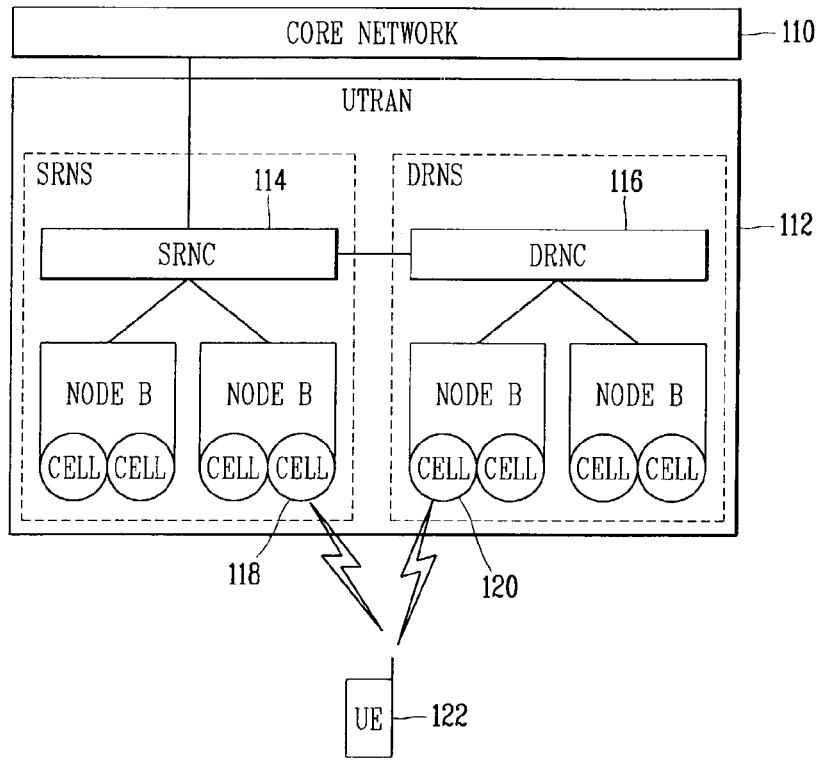
FIG. 6 illustrates a structure of a UMTS radio access network (UTRAN)
Figure 7:
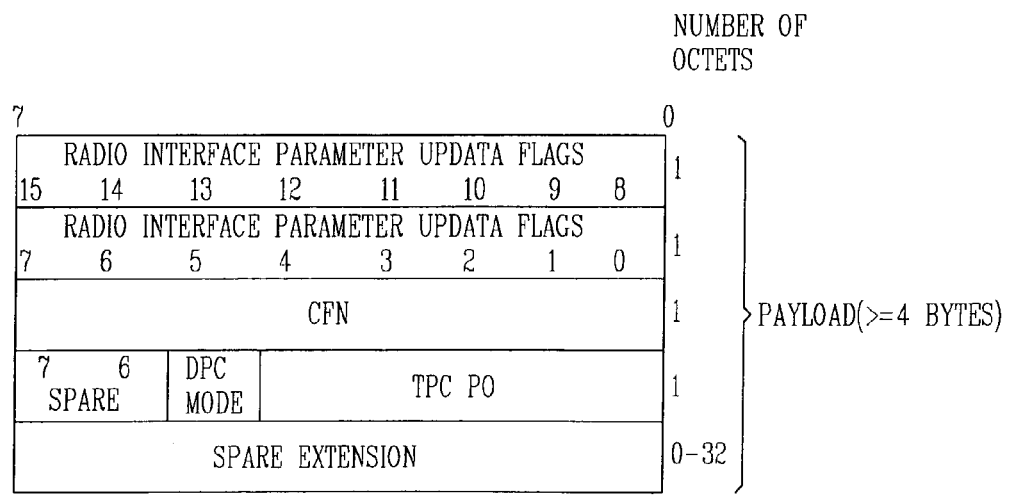
FIG. 7 illustrates a control frame structure used for updating a radio interface parameter in the UTRAN of FIG. 6.

As shown in FIG. 10, a control frame in accordance with a first embodiment of the present invention additionally includes a field (HS-SCCH PO) for transmitting the HS-SCCH PO value relative to the control frame as illustrated in FIG. 7.

At this time, the control frame includes a HS-SCCH PO field, which can be 7 bits of 1 byte. The HS-SCCH PO field is variable. If the HS-SCCH PO field is 7 bit, it is constructed as a format containing 1 spare bit so that the overall payload can be above 5 bytes.

Figure 11:
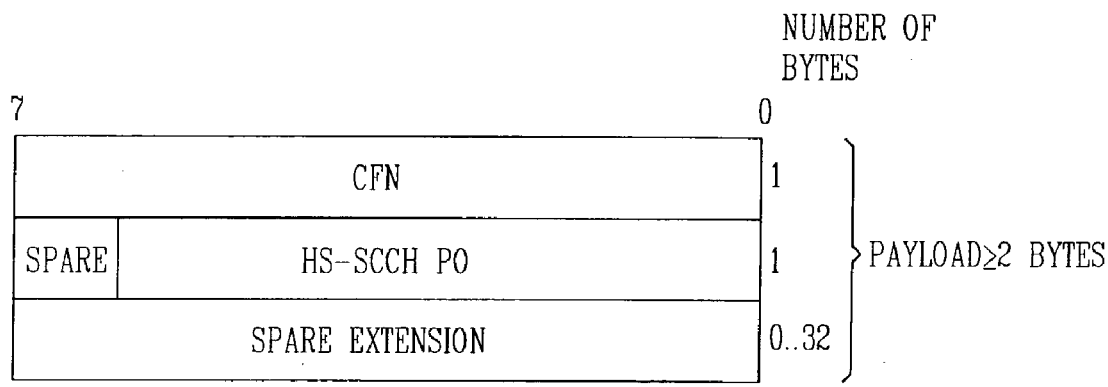
FIG. 11 illustrates a format construction of a fresh control frame to control power of HS-SCCH used for HS-DSCH in accordance with a second embodiment of the present invention.

FIG. 11 illustrates a control frame structure in accordance with a second embodiment of the present invention. The second embodiment of the present invention is preferably a different type than the frame structure of the first embodiment.

As shown in FIG. 11, the control frame in accordance with the second embodiment includes or consists of a 1 byte CFN field, a 7 bit HS-SCCH PO field and a spare extension field. The length of the HS-SCCH PO field is variable and the overall payload can exceed 2 bytes.

The control frame in accordance with the first and second embodiments of the present invention can serve to transmit a PO value determined in the SRNC to the base station in non-handover state or soft handover state.

Therefore, the base station can effectively control the transmission power of the HS-SCCH on the basis of the PO value of the SCCH transmitted through the HS-SCCH PO field of the control frame in non-handover or even if a radio link condition changes such as soft handover.

Generally, in the 3GPP WCDMA, in order to minimize interference occurrence possibly caused due to DPCH transmitted from a plurality of cells in soft handover, a site selection diversity transmit (SSDT) technique is used.

In the SSDT technique, the UE selects a cell with a highest received signal power code (RSCP) value of common pilot channel (CPICH) among active cells, and designates the remaining active cells as non-primary cells and transmits an ID of primary cell to the active cells.

Thereafter, the primary cell transmits the DPCH data while the non-primary cells temporarily stops transmission of the DPCH data. The UE periodically measures the RSCP of CPICH and periodically transmits SSDT ID of the primary cell to every active cell. At this time, the UE transmits the primary cell ID through a feedback information (FBI) field of DPCCH.

Accordingly, in embodiments of the present invention, by utilizing the SSDT method, even whether a base station cell transmitting HS-SCCH is primary or non-primary, as well as whether the DPCCH is in soft handover, is considered. This method can use only an uplink signaling through the FBI field used in the SSDT, irrespective of whether DPCH is operated by the SSDT method.

For this purpose, the SRNC should selectively transmit a power offset value (PO) for the case of soft handover, a power offset value (PO_primary) for the case of primary cell and a power offset value (PO_nonprimary) for the case of non-primary cell through the Iur and Iub.

Figure 12:
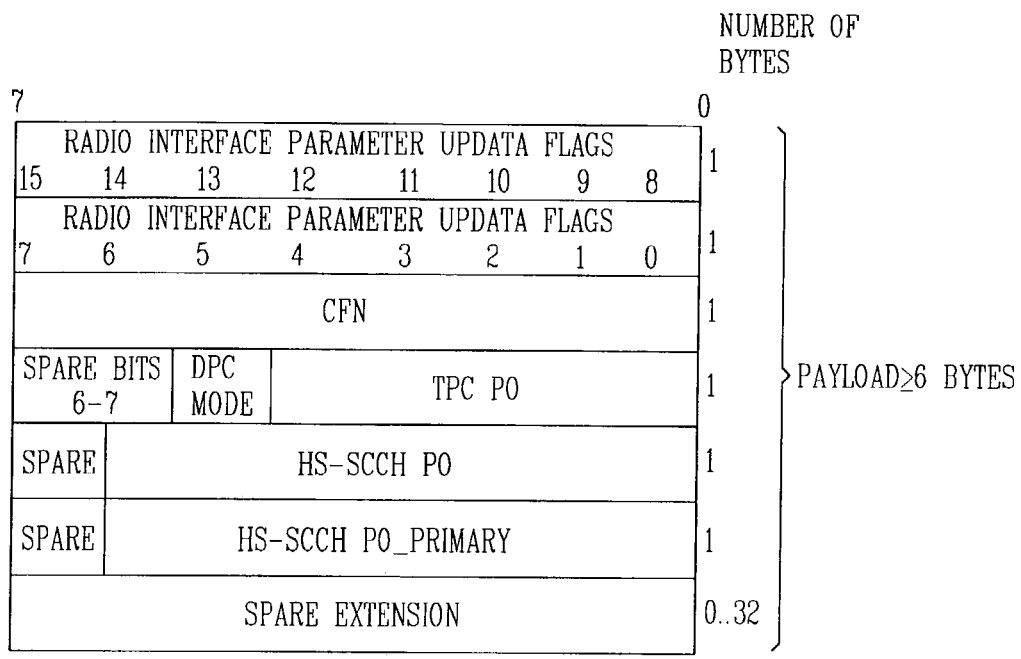
FIG. 12 illustrates a format construction of a radio interface parameter update control frame to control power of HS-SCCH used for HS-DSCH in accordance with a third embodiment of the present invention.

FIG. 12 illustrates a control frame structure in accordance with a third embodiment of the present invention.

As shown in FIG. 12, a control frame in accordance with the third embodiment of the present invention includes a field for transmitting a power offset value (PO_primary) for a primary cell (HS-SCCH PO_primary) in addition to the first embodiment of the present invention as illustrated in FIG. 10. The HS-SCCH PO_primary field can be 7 bits but can be variable, and the overall payload is more than 5 bytes.

In other words, the control frame in accordance with the third embodiment of the present invention serves to transmit a PO value for soft handover and a PO_primary value for a primary cell to the base station. Then, the base station selects one of the two power offset values according to whether the DPCCH is in soft handover and according to whether it is a primary cell in case of the soft handover by using the SSDT cell ID that the UE transmits thereto, and determines transmission power of HS-SCCH.

Figure 13:
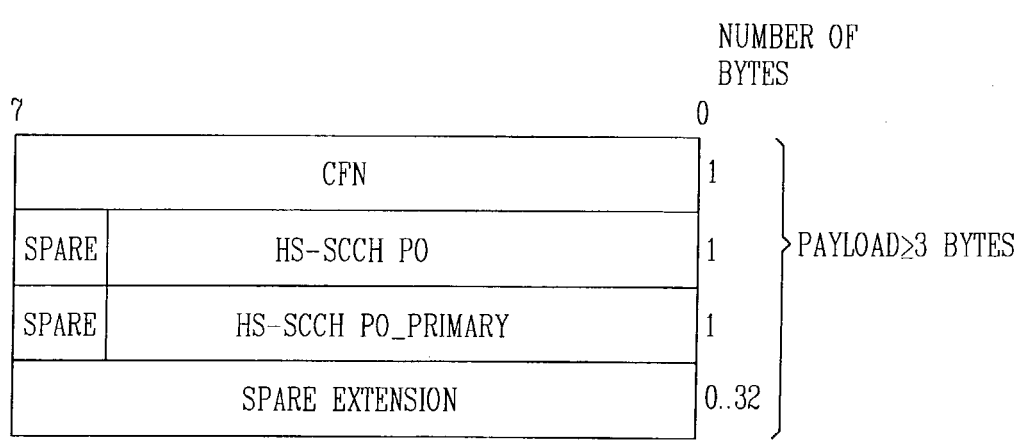
FIG. 13 illustrates a format construction of a fresh control frame to control power of HS-SCCH used for HS-DSCH in accordance with a fourth embodiment of the present invention.

FIG. 13 illustrates a format construction of a control frame to control power of HS-SCCH used for HS-DSCH in accordance with a fourth embodiment of the present invention.

As shown in FIG. 13, a control frame in accordance with the fourth embodiment of the present invention includes or consists of a 1 byte CFN field, a 7 bit HS-SCCH PO field, an HS-SCCH PO_primary field and a spare extension field. The CFN field can be excluded. The length of the HS-SCCH PO field and the HS-SCCH PO_primary field is variable and the overall payload can be more than 3 bytes.

As stated above, the control frame in accordance with the third and fourth embodiments of the present invention serves to transmit the PO value for soft handover and the PO_primary value for a primary cell to the base station. Accordingly, the base station selects one of the two power offset values transmitted through the control frame of FIGS. 12 and 13 according to whether the DPCCH is in soft handover and according to whether the base station cell is primary in case that the DPCCH is in soft handover by using the SSDT cell ID that the UE transmits thereto, and determines transmission power of HS-SCCH.

Figure 14:
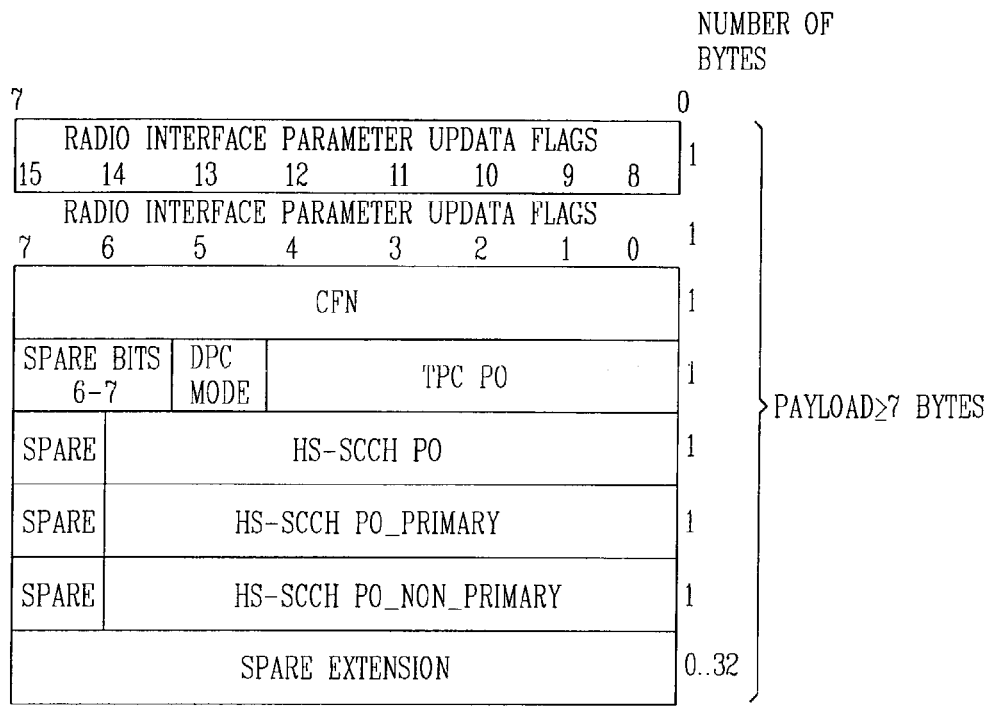
FIG. 14 illustrates a format construction of a radio interface parameter update control frame to control power of HS-SCCH used for HS-DSCH in accordance with a fifth embodiment of the present invention.

FIG. 14 illustrates a format construction of a radio interface parameter update control frame to control power of HS-SCCH used for HS-DSCH in accordance with a fifth embodiment of the present invention.

As shown in FIG. 14, a control frame in accordance with the fifth embodiment of the present invention includes a field for transmitting a power offset value (PO_nonprimary) (HS-SCCH PO-nonprimary) for the case of a non-primary cell, in addition to the third embodiment as illustrated in FIG. 12. The HS-SCCH PO-nonprimary field is shown as 7 bits but can be variable. The overall payload can be 7 bytes.

Figure 15:
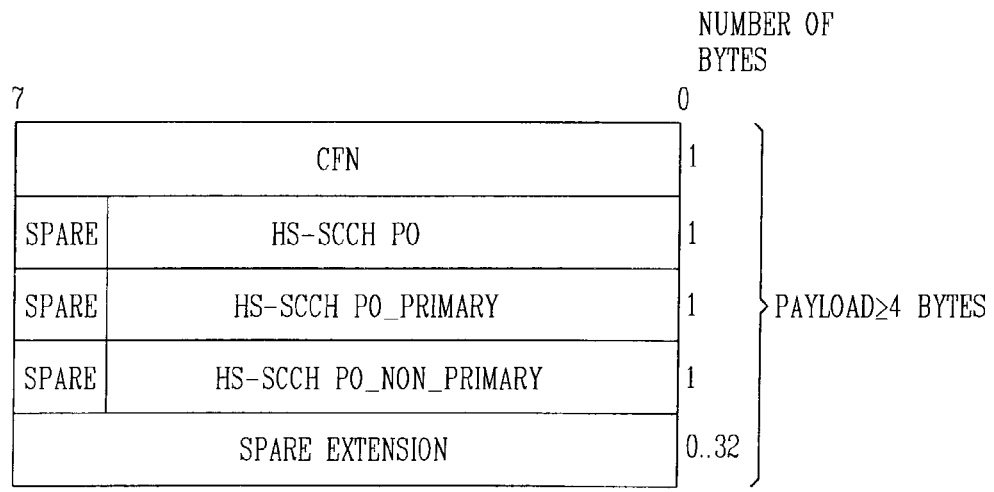
FIG. 15 illustrates a format construction of a fresh control frame to control power of HS-SCCH used for HS-DSCH in accordance with a sixth embodiment of the present invention.

FIG. 15 illustrates a format construction of a control frame to control power of HS-SCCH used for HS-DSCH in accordance with a sixth embodiment of the present invention.

The control frame in accordance with the sixth embodiment includes a 1 byte CFN field, a 7 bit HS-SCCH PO field, an HS-SCCH PO_primary field, HS-SCCH PO_nonprimary field and a spare extension field. The CFN field can be excluded. The length of the HS-SCCH PO field, the HS-SCCH PO_primary field and the HS-SCCH PO_nonprimary field is variable and the overall payload can exceed 3 bytes.

That is, the control frame in accordance with fifth and sixth embodiments serves the PO value for soft handover, the PO_primary value for a primary cell and PO_nonprimary value for a nonprimary cell to the base station. Accordingly, the base station selects one of the three power offset values transmitted through the control frame of FIGS. 14 and 15 according to whether the DPCCH is in soft handover and according to whether it is a primary cell in case of the soft handover by using the SSDT cell ID that the UE transmits thereto, and determines transmission power of HS-SCCH.

The control frame structure for transmitting the HS-SCCH PO value in the user plane has been described.

In embodiments of the present invention, the power control of the HS-SCCH can be performed by adding a power offset parameter for HS-SCCH to the NBAP message or the RNSAP message used in the control plane. That is, when a radio link environment or circumstances are changed such as soft handover of an associated DPCCH, as shown in FIG. 8, the HS-SCCH PO value determined in the SRNC is inserted into the NBAP message or RNSAP message and transmitted to the base station, thereby performing the power control of the HS-SCCH in the control plane.

In the above embodiments, the control message or the control frame can be used between the base station and the RNC or between RNCs, and the HS-DSCH control information is transmitted to the user plane through the control frame or transmitted as an NBAP or RNSAP message type to the control plane.

The control frame and the control message are used to control power of the shared control channel in case that the HS-DSCH associated dedicated physical control channel (DPCCH) is in soft handover or in case that a radio link condition changes.

As so far described, embodiments of the present invention can use a control frame and message transmitted between the base station and RNC and RNCs, through which the power offset value for power control on the shared control channel (HS-SCCH) is transmitted from the RNC to the base station. Accordingly, the power control of the HS-SCCH for the HS-DSCH can be effectively performed in the 3GPP asynchronous system and the UE.

In addition, by using the control frame and message, a power offset (PO) value can be suitably determined according as a radio link is set, according to movement of the UE, according to change in the number of radio links or according to according to a cell status (e.g., primary cell or nonprimary cell) in the base station that transmits a shared control channel, and then, the information is transmitted to the base station, whereby the performance of HS-DSCH can be improved.

In other words, in embodiments of the present invention, the first PO field for transmitting a PO value for non-handover or soft handover of the DPCCH, the second PO field for transmitting a PO value used for the primary cell and the third PO field for transmitting a PO value used for the non-primary cell are selectively implemented in the control frame, so that the transmission power of HS-SCCH can be suitably controlled according to change in the radio link condition.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A control information processing method for a communications system, the method comprising:
   providing, by a serving radio network controller (SRNC), a power offset (PO) value to a drift radio network controller (DRNC) that supports high-speed downlink packet access (HSDPA),
   wherein the PO value is for a first high speed shared channel related to a second high speed shared channel, and the providing is performed via a radio access interface protocol,
   wherein the first high speed shared channel is a high speed shared control channel (HS-SCCH) and the second high speed shared channel is a high speed downlink shared channel (HS-DSCH),
   the first high speed shared channel is a control channel for the second high speed shared channel and the first high speed shared channel has a 2 ms frame, and
   a transmission power of the HS-SCCH is determined by the PO value relative to a dedicated physical control channel (DPCCH).

2. The method of claim 1, wherein if the radio access interface protocol is a control plane protocol, the power offset value is provided in a message.

3. The method of claim 2, wherein the message is a radio network subsystem application part (RNSAP) message used between the SRNC and DRNC.

4. The method of claim 1, wherein if the radio access interface protocol is a user plane protocol, the power offset value is provided in a control frame.

5. The method of claim 4, wherein the control frame comprises:
a radio interface parameter update flag field indicating existence or non-existence of a parameter; and
a PO field used for transmitting a PO value for power control of the HS-SCCH.

6. The method of claim 5, wherein the control frame further comprises:
a connection frame number (CFN) field.

7. The method of claim 5, wherein the PO field is used to transmit a PO value for non-handover or soft handover of a dedicated physical control channel (DPCCH).

8. The method of claim 4, wherein the control frame comprises:
a connection frame number (CFN) field which is selectively included; and
a PO field used for transmitting a PO value for non-handover or soft handover of a dedicated physical control channel (DPCCH).

9. The method of claim 4, wherein the control frame comprises:
a radio interface parameter update flag field indicating existence or non-existence of a parameter;
a connection frame number (CFN) field;
a transmit power control (TPC) power offset (PO) field;
a downlink power control (DPC) mode information field;
a first PO field used for transmitting a PO value for soft handover of DPCCH; and
a second PO field used for transmitting a PO value for HS-SCCH used for a primary cell.

10. The method of claim 4, wherein the control frame comprises:
a connection frame number (CFN) field which is selectively included;
a first PO field used for transmitting a PO value for soft handover of DPCCH; and
a second PO field used for transmitting a PO value for HS-SCCH used for a primary cell.

11. The method of claim 4, wherein the control frame comprises:
a radio interface parameter update flag field indicating existence or non-existence of a parameter;
a connection frame number (CFN) field;
a transmit power control (TPC) power offset (PO) field;
a downlink power control (DPC) mode information field;
a first PO field used for transmitting a PO value for soft handover of DPCCH;
a second PO field used for transmitting a PO value for HS-SCCH used for a primary cell; and
a third PO field used for transmitting a PO value of HS-SCCH used for a non-primary cell.

12. The method of claim 4, wherein the control frame comprises:
a connection frame number (CFN) field which is selectively included;
a first PO field for transmitting a PO value for soft handover of DPCCH;
a second PO field for transmitting a PO value for HS-SCCH used for a primary cell; and
a third PO field for transmitting a PO value of HS-SCCH used for a non-primary cell.

13. A control information processing method for a communications system, the method comprising:
receiving, by a drift radio network controller (DRNC), a power offset (PO) value from a serving radio network controller (SRNC) that supports high-speed downlink packet access (HSDPA),
wherein the PO value is for a first high speed shared channel related to a second high speed shared channel, and the receiving is performed via a radio access interface protocol,
wherein the first high speed shared channel is a high speed shared control channel (HS-SCCH) and the second high speed shared channel is a high speed downlink shared channel (HS-DSCH),
the first high speed shared channel is a control channel for the second high speed shared channel and the first high speed shared channel has a 2ms frame, and
a transmission power of the HS-SCCH is determined by the received PO value relative to a dedicated physical control channel (DPCCH).

14. The method of claim 13, wherein the radio access interface protocol is an Iur interface protocol.

15. The method of claim 13, wherein if the radio access interface protocol is a control plane protocol, the power offset value is provided in a message.

16. The method of claim 15, wherein the message is a radio network subsystem application part RNSAP message used between the SRNC and DRNC.

17. The method of claim 13, wherein if the radio access interface protocol is a user plane protocol, the power offset value is provided in a control frame.

18. The method of claim 17, wherein the control frame comprises:
a radio interface parameter update flag field indicating existence or non-existence of a parameter; and
a PO field used for transmitting a PO value for power control of the HS-SCCH.

19. The method of claim 18, wherein the control frame further comprises:
a connection frame number (CFN) field.

20. The method of claim 18, wherein the PO field is used to transmit a PO value for non-handover or soft handover of a dedicated physical control channel (DPCCH).

21. The method of claim 17, wherein the control frame comprises:
a connection frame number (CFN) field which is selectively included; and
a PO field used for transmitting a PO value for non-handover or soft handover of a dedicated physical control channel (DPCCH).

22. The method of claim 17, wherein the control frame comprises:
a radio interface parameter update flag field indicating existence or non-existence of a parameter;
a connection frame number (CFN) field;
a transmit power control (TPC) power offset (PO) field;
a downlink power control (DPC) mode information field;
a first PO field used for transmitting a PO value for soft handover of DPCCH; and
a second PO field used for transmitting a PO value for HS-SCCH used for a primary cell.

23. The method of claim 17, wherein the control frame comprises:
- a connection frame number (CFN) field which is selectively included;
- a first PO field used for transmitting a PO value for soft handover of DPCCH; and
- a second PO field used for transmitting a PO value for HS-SCCH used for a primary cell.

24. The method of claim 17, wherein the control frame comprises:
- a radio interface parameter update flag field indicating existence or non-existence of a parameter;
- a connection frame number (CFN) field;
- a transmit power control (TPC) power offset PO field;
- a downlink power control (DPC) mode information field;
- a first PO field used for transmitting a PO value for soft handover of DPCCH;
- a second PO field used for transmitting a PO value for HS-SCCH used for a primary cell; and
- a third PO field used for transmitting a PO value of HS-SCCH used for a non-primary cell.

25. The method of claim 17, wherein the control frame comprises:
- a connection frame number (CFN) field which is selectively included;
- a first PO field for transmitting a PO value for soft handover of DPCCH;
- a second PO field for transmitting a PO value for HS-SCCH used for a primary cell; and
- a third PO field for transmitting a PO value of HS-SCCH used for a non-primary cell.

* * * * *